Dec. 7, 1943.　　　L. BARON ET AL　　　2,336,212
STRIPPER FOR MOLDING PRESSES
Filed July 19, 1941　　　3 Sheets-Sheet 1

INVENTORS
Leonard Baron
BY John Hoch
ATTORNEY

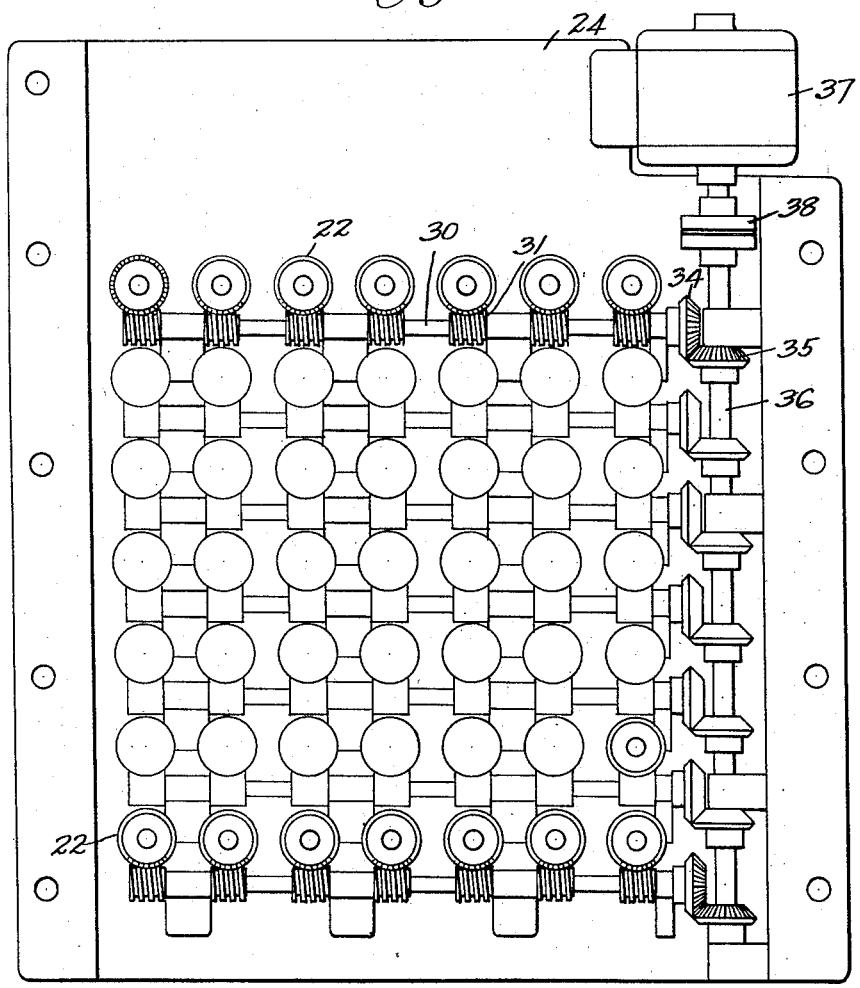

Dec. 7, 1943.  L. BARON ET AL  2,336,212
STRIPPER FOR MOLDING PRESSES
Filed July 19, 1941  3 Sheets-Sheet 3
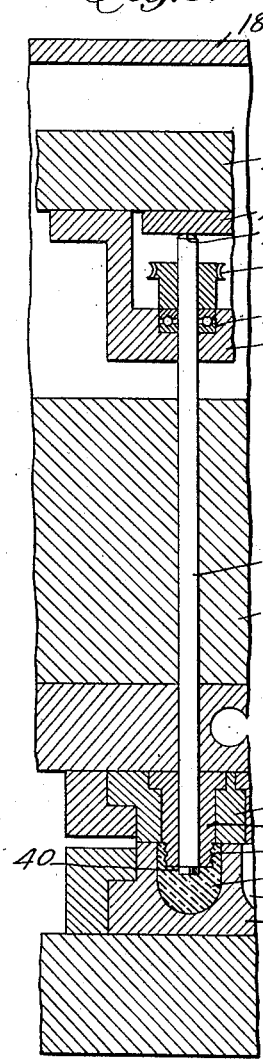
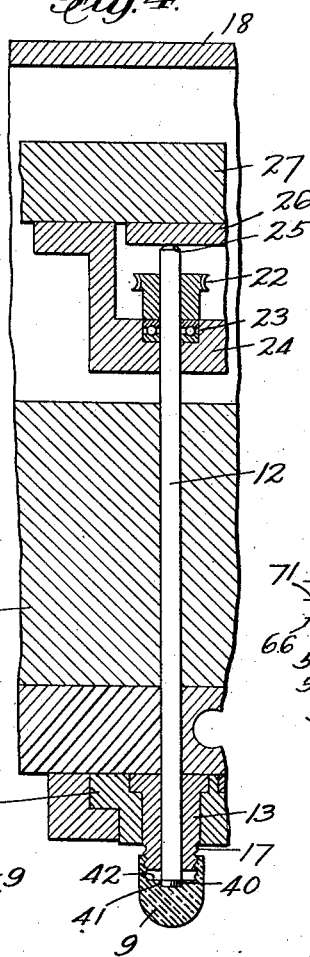
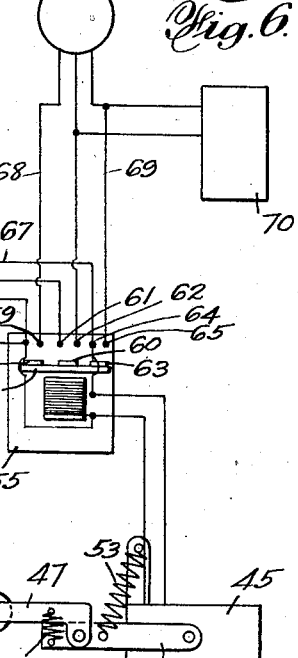
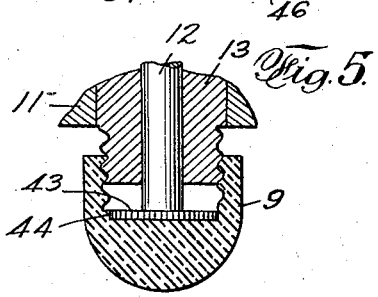
INVENTORS
*Leonard Baron*
BY *John Hoch*
ATTORNEY Patented Dec. 7, 1943

2,336,212

UNITED STATES PATENT OFFICE 2,336,212

STRIPPER FOR MOLDING PRESSES

Leonard Baron, Franklin Square, and John Hoch, Corona, Long Island, N. Y., assignors to Victor Metal Products Corporation, Brooklyn, N. Y., a corporation of New York Application July 19, 1941, Serial No. 403,136

20 Claims. (Cl. 18—16)

This invention relates to molding presses and particularly to that type adapted to mold threaded container caps and the like, usually made of synthetic plastics, and to automatically unscrew the caps from the correspondingly threaded mold cores on which the caps are formed.

In such presses, a fixed mold cooperates with a vertically reciprocating mold adapted to receive plastic pellets or tablets to mold a plurality of articles at one time under pressure, one from each pellet. The lower movable mold is reciprocated by mechanical power connections or by hydraulic pressure means, moving away from the fixed core mold after completion of the molding operation and leaving the threaded articles on the fixed cores. The molded articles are then unscrewed from the respective cores manually or automatically.

This invention relates to the means for unscrewing the articles automatically from their threaded cores and contemplates the provision of simple means and a simple method for doing so, which means operates positively and unfailingly by positive engagement with the articles, as distinguished from stripping means which frictionally engage or rub against the articles, the method involving the molding of the article on a stripping tool and the rotation and simultaneous advance of the tool corresponding to the pitch of threads of the cores.

This invention further contemplates the provision of a stripping unit having a combined rotary and axial movement sufficient to unscrew the molded articles, and movable vertically by means of simple mechanism with respect to the fixed mold cores and so associated therewith that only a small amount of movement of the stripping unit is required and a simple and compact unit results.

The invention further contemplates the provision of means for forming a tool-engaging member such as a socket in the molded article and for stripping the article from the threaded core by the proper rotary and rectilinear movement of said means.

The invention further contemplates the provision of a revoluble stripping rod for each mold core arranged to have its end part molded into the article and of means for rotating the rod and therethrough rotating the article in the stripping direction while feeding the rod longitudinally to effect the stripping action.

The various objects of the invention will be clear from the description which follows and from the drawings, in which, Fig. 1 is a vertical section of a part of a press showing our improved stripping mechanism, showing the lower movable mold during the last part of its downward movement, and showing the stripping unit in the position assumed thereby just after the stripping operation has been completed.

Fig. 2 is a top plan view of the means for rotating the stripping rods.

Fig. 3 is an enlarged fragmentary vertical section of the stripping rods and molds in the position assumed thereby during the molding operation.

Fig. 4 is a similar view of the same in the positions assumed thereby after the movable mold has been lowered and just after the stripping operation has begun.

Fig. 5 is a fragmentary vertical section of a modified form of the molding end part of the stripping rod.

Fig. 6 is an electrical diagram of the connections to the stripping motor, starting switch, the solenoid valve, and the solenoid switch controlling the valve and motor.

Figure 1:
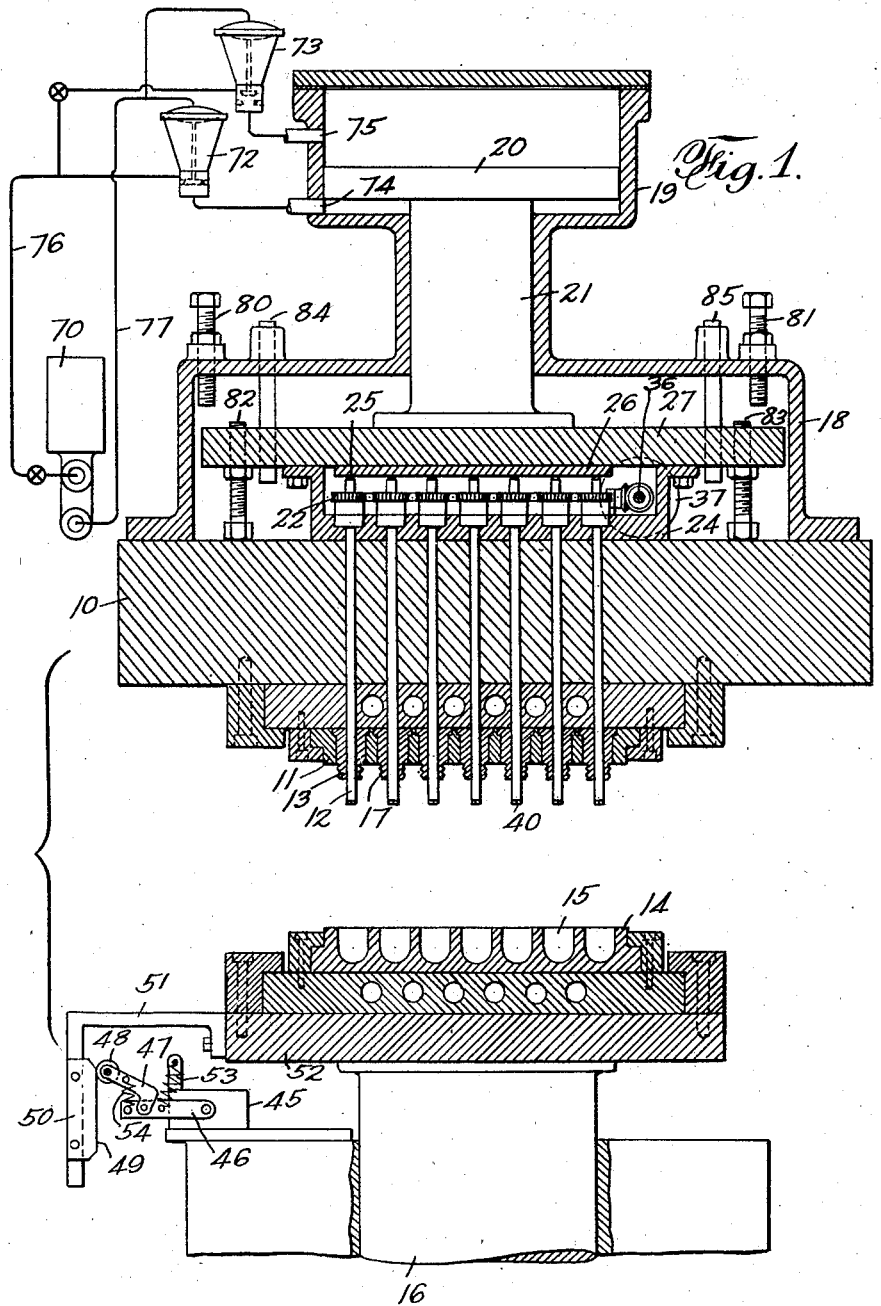

In the practical embodiment of the invention shown by way of example, none of the parts of the well-known molding press are shown except the molds and their supports, it being understood that the operating and supporting parts of such presses are well-known and that the present invention is applied to presses of the type heretofore customarily used. The fixed support 10 for the mold core-plate 11 removably carries said plate in the usual manner in a relatively fixed position during the molding operation. Said support 10 slidably carries the reciprocatory stripping unit and the means for rotating the stripping rods 12. Each of said rods is revolubly and slidably mounted in the support 10 and in one of the mold cores 13, the rod passing through the core and having an end part projecting therefrom, there being a plurality of mold cores in the core-plate.

The lower movable mold plate 14 is provided with a corresponding plurality of mold cavities 15, there being the usual means, exemplified by the ram 16, to vertically reciprocate the plate 14 at the proper time. After the mold cavities have been filled with pellets or tablets of the moldable material, the lower mold is raised to arrange the respective cores 13 in their corresponding cavities 15 thereby to apply pressure to the pellet to mold it to the required shape in the usual manner. The core, however, being externally threaded as at 17, the article, in this case illustrated as the cap 9, is formed with internal threads (Fig. 3) by means of which the article is held to the core when the lower plate is moved downwardly away from the cores. It therefore becomes necessary to unscrew the molded articles which remain attached by the screw-threaded connection thereof to the core. The automatic stripping unit is provided for that purpose.

The entire unit is supported by and is movable relatively to the support 10 to which is suitably secured the hollow frame 18 provided with a suitable cylinder 19 in which operates the piston 20. Means, later to be described, are provided for reciprocating the piston and, through the piston rod 21, correspondingly reciprocating the entire stripping unit within the frame 18. As has been hereinbefore indicated, the stripping unit consists of a plurality of stripping rods 12 each passing through one of the cores 13 and mounted for slidable and rotary movement therein and therethrough. Each of the rods 12 also passes through the fixed support 10 and at its upper end carries a worm wheel as 22 fixed thereto. A suitable bearing as 23 in the support member 24 is provided for each of the rods and each of the wheels 22, but relative longitudinal movement of the rod and said member 24 is prevented, as by abutting the uppermost end 25 of the rod against the plate 26 which is secured to the top support member 27, said top member being in turn secured to the piston rod 21. It will thus be seen that reciprocation of the piston 20 reciprocates the members 24 and 27 and therethrough reciprocates the stripper rods 12 and the worm wheels fixed thereto.

Since the stripper rods are arranged in rows corresponding to the rows of cavities 15 in the lower mold plate, a single worm shaft is utilized to effect rotation of all of the worm wheels in a row simultaneously. As best seen in Fig. 2, the worm shaft 30 carries a series of worms 31 each meshing with one of the worm wheels 22. The worm shaft terminates in the bevel gear 34 meshing with the bevel gear 35 on the motor shaft 36. Said shaft is suitably supported by the member 24 as is the motor 37 on said shaft. Suitable reduction gearing and couplings 38 may be interposed between the motor and the motor shaft to rotate said shaft at the required speed in a manner which is well understood and hence need not be described in detail. It will therefore be seen that on energization of the motor 37, the worm wheels 22 and the stripper rods 12 are all rotated through the motor shaft, bevel gears 35, 34, and worms 31. A worm shaft such as the shaft 30 is used for each row of cavities and worm wheels, there being bevel gears similar to the gears 35, 34 to connect the worm shaft with the motor shaft. All of the stripper rods for all of the molds are therefore rotated simultaneously to unscrew all of the caps at the same time.

In the uppermost position of the piston 20, the stripper rod 12 is not entirely withdrawn within the core 13, but an end portion 40 thereof projects beyond the core (Fig. 3). Said end portion serves as a wrench and is preferably of square or other polygonal shape so that when the article 9 is molded, a corresponding cavity or socket 41 is molded in the inner base 42 of the article receiving and filled by the wrench-like end of the stripper rod. Rotation of the stripper rod 12 as above described consequently causes positive rotation of the article in the direction to unscrew the article from the threads 17 of the core, it being understood that simultaneously with the rotation of the stripper rod, an axial movement, corresponding to the pitch of the screw threads 17, is given to the stripper rod by downward movement of the piston 20 and consequent downward movement of the entire stripping unit including the members 21, 24, 27, the worm wheels 22, the worms and worm shafts, and gearing, and the motor and motor shaft.

As shown in Fig. 5, the lowermost end of the stripper rod 12 instead of being made square or other polygonal shape, may be enlarged into the form of an edge roughened, knurled, serrated, or other non-circular disc 43 to produce a cavity 44 having serrated, knurled or other non-circular walls adequately gripped by the disc 43 to permit positive wrench-like engagement between the disc and the cap and also providing a suitable recess for the reception of the usual cap liner.

Means are provided for energizing the motor 37 at the proper time and for the proper period to cause complete unscrewing of the caps from their cores and also to energize and open the valves controlling the fluid under pressure which is supplied to the cylinder 19 alternately above and below the piston, it being understood that the speed of movement of the piston and the speed of rotation of the stripper rods are synchronized in accordance with the pitch of the screw threads formed on the cap. Accordingly, the starter switch 45 (Fig. 1) is provided with the switch arm 46 on which is pivoted the lever 47, preferably though not necessarily spring-pulled toward the arm 46 by means of the spring 54. The spring 53 serves normally to pull the switch arm 46 to an open upwardly inclined position. At the end of the switch-operating lever 47 is the roller 48 engaging the cam edge 49 of the plate cam 50 fixed to an extension 51 of the bed plate 52 which carries the movable mold plate 14.

Normally, the switch 45 being open, the roller 48 is off the cam 50, while the lever 47 and the switch arm 46 are substantially parallel and in an upwardly inclined position, the roller 48, nevertheless, being in the path of the lower bevelled part of the edge 49 of the plate cam 50. On the downward movement of the ram 16, that is, on the opening or separation of the molds, the bed plate 52 and its extension 51, together with the cam 50 all move downwardly, whereby said lower bevelled part of the edge 49 engages the roller 48 and carries said roller therewith in a downward direction to rotate the levers 47 and 46 in a counterclockwise direction and thereby to close the switch, the arm 46 being horizontal when the switch is closed. On further downward movement of the cam 50, the roller being in contact with the lower bevelled part of the cam edge 49, said roller is forced inwardly by said bevelled edge part until it reaches and rolls along the vertical part of the edge 49. On continued downward movement of the cam, the roller 48 passes the top of the cam and is freed of constraint by the cam, at which time tension on the spring 54 is released and said spring becomes effective to pull the lever 47 into its normal position in which it is substantially aligned with the lever 46. However, when the lever 47 is no longer confined by the cam, the spring 53 becomes effective automatically to open the switch. On the upward movement of the bed plate 52 and the cam 50 carried thereby, the switch being open, the upper bevelled edge part of the cam merely rocks the lever 47 and its roller out of the path of the cam without operating the switch, the spring 54 bringing the lever 47 back into its aligned relation to the lever 46 after the cam has moved upwardly enough to pass the roller. In the aligned positions of the levers, the roller is again in the path of the lower bevelled part of the cam edge 49, ready for the closing of the switch on the next downward movement of the cam as hereinbefore described.

In the lowermost position of the movable mold, the pellets or tablets of moldable plastic are inserted into the mold cavities 15. The ram is then started on its upward movement, whereby the upper bevelled part of the cam edge 49 engages and lifts the roller 48, thereby rotating the lever 47 or causing it to yield in a clockwise direction while the switch remains open. On further upward movement of the ram, the lever 47 may yield further in a clockwise direction until the roller leaves the cam, whereafter the spring 54 pulls the lever 47 against the arm 46 ready for the repetition of the operation.

When the starting switch is closed on the downward movement of the ram, the motor 37 is energized and the stripper rod 12 rotated. Simultaneously, fluid under pressure is admitted in the cylinder 19 above the piston 20 to lower the piston and to move the stripper rods longitudinally. This is accomplished by means of the solenoid switch 55 (Fig. 6). The solenoid of the switch being energized on the closing of the starting switch 45, the armature 56 thereof is moved to carry the contact member 57 thereof into contact with the terminals 58 and 59, and simultaneously to carry the contact member 60 thereof into contact with the terminals 61, 62, and further to carry the contact member 63 thereof into contact with the terminals 64 and 65. The contact members 57 and 63 close the circuit from the power line 66, 67 to the motor 37 through the conductors 68, 69. Simultaneously, the circuit is closed to the solenoid valve 70, from the current supply line 71, 67 through the contact members 60 and 63.

The solenoid valve 70 is preferably of any well-known type not necessary to be shown nor described in detail. It need merely be stated that the valve is of the type which opens the supply line of fluid under pressure to the space above the piston 20 when said solenoid valve is energized, and which when de-energized opens the supply line to the space beneath the piston 20. For this purpose, the diaphragm valves 72, 73 are inserted in the lines 74, 75 to the respective spaces below and above the piston 20. Said diaphragm valves operate in opposite directions, that is to say, when the valve 72 is open, the valve 73 is closed and vice versa. When the solenoid valve 70 is energized, the supply line to the lower parts of the diaphragm valves 72, 73 is open. The diaphragms of said valves are thereby operated to close the valve 72 and to open the valve 73, thereby admitting fluid under pressure to the space in the cylinder 19 above the piston 20. The piston is thereby lowered, together with the entire stripping unit including the stripping rods 12 which are in the meantime rotated by reason of the simultaneous energization of the motor 37, to perform the stripping operation.

When the solenoid valve 70 is de-energized by the opening of the switch 45, the supply line 76 to the lower parts of the diaphragm is closed and the supply line 77 to the upper parts of said valve is open. This causes the diaphragm valve 72 to open and the valve 73 to close. Fluid under pressure is thereby admitted underneath the piston 20 to raise the stripping unit into its uppermost position ready for the repetition of the molding operation.

It will be understood that the diaphragm valves described are preferably of the three-way type, being of such nature that when the supply line 74 is open, and the valve 72 is open, the line 75 becomes an outlet line and the valve 73 while closed for the supply of fluid, is open for the discharge of fluid from the space above the piston in a well-known manner. It will further be understood that when fluid under pressure is admitted above the piston, the fluid beneath the piston is discharged through the line 74, which becomes an outlet line.

To accurately control the amount of longitudinal movement of the stripper rods 12, suitable adjustable stops may be provided. As shown in Fig. 1, the adjustable stops 80, 81 in the form of bolts screwed into the frame 18, engage the upper surface of the support member 27 in the uppermost position of the stripping unit and thereby accurately position the stripper rods for the molding operation. Similarly, the adjustable bolts 82, 83 limit the downward movement of the member 27 and the remainder of the stripping unit carried thereby. Suitable guide pins as 84, 85 passing through the fixed frame 18 and through the support member 27 serve to guide the stripping unit in its reciprocatory movement.

It will be understood that suitable mechanical connections may be substituted for the fluid pressure means and valves illustrated for operating the stripper unit, and that various other changes may be made in the illustrated embodiment of the invention shown herein.

It will be seen, nevertheless, that there has been provided hereby a simple stripping mechanism capable of positively gripping and rotating the articles molded on the screw core and unscrewing said articles in an efficient manner with a comparatively small amount of movement of the parts and in a manner designed to fulfill the purpose for which the invention is intended.

We claim:

1. The method of stripping articles from a threaded core on which the articles are molded comprising molding the article on a stripping tool associated with the core to form a cavity in the article engaged by the tool, then rotating the tool and the article in a stripping direction while simultaneously advancing the tool axially of the article.

2. The method of stripping molded threaded articles from a threaded core on which the articles remain mounted after the completion of the molding operation comprising molding a tool-engaging cavity in the article and rotating the article and simultaneously advancing it axially while the tool is maintained in the cavity.

3. The method of stripping a plurality of molded threaded articles simultaneously from the respective threaded cores on which the articles remain mounted after the completion of the molding operation comprising simultaneously molding said articles on individual stripping tools for each article to form a cavity in each article filled by a stripping tool, then rotating all of said articles and tools simultaneously while simultaneously advancing them axially at a rate corresponding to the pitch of the threads of the articles.

4. The method of stripping screw threaded molded articles from threaded mold cores each having a stripping tool passing therethrough comprising projecting the tool slightly through its core, molding the article around the threaded core and around the projecting part of the tool to form a cavity in the article spaced from the threads of the core and filled by the projecting end of the tool, then rotating the tool and thereby rotating the article in a stripping direction relatively to the core while simultaneously advancing the tool and the article axially at a rate corresponding to the pitch of the screw threads of the core.

5. In a molding press, a threaded core, a stripping rod slidably and rotatably mounted in the core, means for rotating said rod, and means for simultaneously advancing the rod rectilinearly.

6. In a molding press, a plurality of threaded mold cores, a stripping rod passing loosely through each of the cores, means for simultaneously rotating said rods, and means for reciprocating said rod-rotating means and the rods as a unit relatively to the cores.

7. In a molding press, threaded cores adapted to mold threads in a plurality of articles, means for stripping the articles from the cores comprising a stripping rod for each of the cores, means for molding the articles on the cores and on the extreme ends of the rods to form a cavity in each of the articles engaged by the respective rod ends, means for rotating said rods simultaneously, and means for moving said rod-rotating means and said rods axially of the threaded cores in one direction to strip the articles from the cores and in the other direction to position the rods for the molding operation.

8. In a molding press, threaded core to form a threaded article, means for molding an article on the core, and means for stripping the article from the core comprising a rod passing through the core and terminating in a wrench-like end portion projecting beyond the core during the molding operation and adapted to mold a cavity in the article, said cavity being provided with rotation-resisting walls corresponding to the wrench-like end of the rod, and means for rotating and simultaneously axially advancing the rod.

9. In a molding press, a threaded core, a rod passing through the core, means for rotating the rod including a motor and gearing interposed between the motor and the rod, and means for moving the motor, gearing and rod as a unit axially of the core.

10. In a molding press, a relatively fixed mold member provided with a threaded mold core, a relatively movable mold member, an article-stripping unit carried by the fixed mold member and adapted for reciprocation relatively to the core and comprising a stripping rod within the core, a gear on the rod, a motor, gearing operated by the motor and engaging the rod gear, and means for reciprocating the unit relatively to the core, said rod being of sufficient length to permit the article to be molded on the end thereof, and means on the movable mold member for controlling the operation of the motor and of the reciprocating means.

11. In a molding press, threaded core, an article-stripping member passing through the core and terminating in a non-circular end part projecting through the core during the molding operation thereby to form a corresponding cavity in the molded article, means for molding the article on the core and on said end, and means for rotating and simultaneously advancing the member to strip the article from the core.

12. In a molding press, threaded mold core, a stripping member having a non-circular end part projecting through the core during the molding operation, and means movable axially of the core and operatively connected to the member to rotate the member.

13. In a molding press, a first mold member having a mold cavity therein, a second mold member movable into and out of the cavity to mold an article therein, said members constituting a mold, a combined stripping member and mold member having a non-circular end portion thereon projecting into the cavity during the molding operation thereby to form a non-circular recess in the article filled by said end portion, means for relatively moving the first and second mold members to open and close the mold, and means for rotating and simultaneously advancing said combined member and said article as a unit.

14. In a molding press, a relatively fixed mold member, a threaded core carried by the mold member, a relatively movable mold member, means for stripping the articles molded on the core including a stripping member passing through the core and projecting into the movable mold member during the molding operation, means for rotating the stripping member after the separation of said mold members, means for moving the stripping member and the rotating means as a unit axially of the mold members, and means carried by the movable mold member to control the operation of the rotating means and of the means for moving the stripping member axially.

15. In a molding press, a stripping unit comprising a support, a motor carried by the support, a plurality of stripping members carried by the support, means interposed between the motor and the members for rotating the members on the operation of the motor, means for reciprocating the support, and means for energizing the motor and for simultaneously operating the reciprocating means.

16. In a molding press, a stripping unit including a member adapted to have an article molded thereon, means for rotating said member including a motor, means for reciprocating the motor and the member as a unit, electrically operated means for controlling the operation of the reciprocating means, and means for simultaneously energizing the motor and said electrically operated means during the stripping operation.

17. In a molding press having a fixed mold, threaded cores carried by the mold, a stripping member passing through each core and projecting therebeyond, a motor, means operatively connecting the motor to the stripping members, means for reciprocating the motor, the connecting means, and the stripping members as a unit including a piston responsive to fluid under pressure, a pair of diaphragm valves arranged to admit fluid under pressure alternately on opposite sides of the piston, and an electrically responsive solenoid valve to control the operation of the diaphragm valves, a movable mold, a cam carried by the movable mold, and a starter switch having a member interposed in the path of the cam to close the switch when the movable mold is separated from the fixed mold, said starter switch energizing the solenoid valve and the motor when closed.

18. In a molding press, a threaded core fixed against rotation, a stripping rod slidably and rotatably mounted in the core, means for molding an article on the core and on the end of the rod, and means for rotating and simultaneously axially advancing the rod and the article relatively to the fixed core.

19. In a molding press, a fixed mold member comprising threaded cores, a stripping member passing through each core to strip from the core an article molded thereon, a piston carrying the stripping members, means for reciprocating the piston and the members as a unit, means for rotating the members during the reciprocating stroke thereof in the stripping direction through the core and means for controlling the operation of the rotating means.

20. In a molding press, a relatively fixed mold member, a plurality of externally threaded cores fixed to the mold member with the threaded parts of the cores projecting from the mold member, a stripping member passing through each core to strip from the core an article molded thereon, means for reciprocating the stripping members, means for rotating the stripping members during the stroke thereof in the stripping direction through the core and means for controlling the operation of the rotating means comprising a movable mold member cooperating with the fixed mold member to mold articles therein, a cam carried by the movable mold member, a control member in the path of the cam and operable thereby and means operatively connecting the control member to the rotating means.

LEONARD BARON.
JOHN HOCH.